Jan. 2, 1968   NOBUYUKI NAKAJIMA   3,361,549
METHOD AND APPARATUS FOR MANUFACTURING GLASS BEADS
Filed April 4, 1967

*INVENTOR.*
NOBUYUKY NAKAJIMA
BY
ATTORNEYS

# United States Patent Office 3,361,549
Patented Jan. 2, 1968

3,361,549
METHOD AND APPARATUS FOR MANUFACTURING GLASS BEADS
Nobuyuki Nakajima, Fukuoka-shi, Japan, assignor to Fukuoka Tokushugarasu Kabushiki Kaisha, Fukuoka-shi, Japan, a joint-stock company of Japan
Filed Apr. 4, 1967, Ser. No. 628,400
Claims priority, application Japan, Dec. 20, 1962, 37/77,735
5 Claims. (Cl. 65—21)

ABSTRACT OF THE DISCLOSURE

This invention discloses a furnace for the manufacture of glass beads of about .5 to .05 mm. in diameter, wherein the problems of glass particles sticking to the walls of the furnace is overcome. The furnace stack comprises a vertical peripheral wall enclosing a space for the upward flow of molten glass in the central portion of the stack, toward the top of the stack which is sealed from the atmosphere, where the flow of the mixture of gases and glass spreads out in all directions and returns downwardly between the stack walls and the upward central flow. A peripheral hopper is positioned at the lower end of the stack for collecting the glass beads which have been formed, with exhaust gases passing through the opening between the top of the hopper and the stack walls. The downward flow of gas and beads act as a buffer between the hot center section upward flow and the relatively cool stack walls thereby preventing the upwardly flowing molten glass from sticking to the furnace walls.

This is a continuation-in-part of my original application Ser. No. 330,102, filed Dec. 12, 1963, and now abandoned.

This invention is directed to an improved apparatus and method for the production of glass beads from molten glass whereby the danger of the glass beads or particles sticking together and/or sticking to the sides of the apparatus is eliminated.

In the past glass beads have been formed by introducing at the bottom of a furnace, molten glass and a high velocity gaseous flame which fragmentizes the molten glass and propels the fragments upwardly to the top of the furnace where the glass is discharged in the form of glass beads. In these types of apparatus, the glass, as it is propelled by the flames, is heated to a temperature above its fusion point causing it to spherulize to form glass beads. As the beads are discharged from the top of the furnace, which is open to the atmosphere, the glass is cooled to a solid spherical bead. The problem inherent in utilizing these types of apparatus is that the molten glass, as it forms beads, tends to stick to each other, or to the wall of the furnace as it is propelled toward the open top of the furnace. This causes shut-downs in the furnace giving rise to vast losses in production, manpower, material, heat and energy as well as damage to the apparatus.

The improvement in accordance with this invention relates to the provision of a novel furnace where in the top end of the stack is sealed from the atmosphere and the formed glass beads are collected at the bottom end of the furnace stack where the glass particles and upwardly directed hot flame is introduced. By providing such modifications in the method and apparatus utilized for forming glass beads, the sticking together of the molten glass particles as well as the sticking of the molten glass particles to the furnace walls is eliminated. This is true, since, it has been found that sticking of the glass particles in the furnace where molten glass is converted to beads, occurs when the stack is open to the atmosphere at its upper end and when these particles are in the molten, or partially molten stage. Therefore, by sealing the upper end of the furnace stack from the atmosphere, gas loss to the atmosphere is prevented. Furthermore, an umbrella effect is provided, whereby the combustion gases and glass, once it reaches its apogee, is propelled downward by convection and gravity along the sides of the furnace walls. By eliminating the gas loss to the atmosphere at the top of the stack, and by providing a barrier between the side walls of the furnace and the upwardly flowing glass particles in their molten or partially molten state, by virtue of the downwardly flow of gases, it has been found that the danger of the molten glass particles sticking to each other or to the furnace side walls during the molten or partially molten state is eliminated.

The above advantageous results are attributable to the fact that when the top of the furnace is sealed from the atmosphere, the hot gases do not dissipate directly into the atmosphere, but rather spreads out in all directions at the top of the furnace, and forms an umbrella effect which causes the glass beads to flow with the gases around the furnace in the opposite direction to the upwardly projected flowing molten beads. The flow of gases and beads downwardly from the top of the furnace, it has been found, acts as a buffer between the hot center section of the furnace, wherein the burner flame is located and the relatively cool inner walls of the furnace. Furthermore, the glass beads and combustion gas flowing down the interior of the furnace stack, act as a buffer between the inner walls and the upwardly flowing molten glass, thereby preventing the upwardly flowing molten glass from adhering to the side walls of the furnace.

In accordance with the principles of the present invention, there is provided an apparatus for manufacturing glass beads, comprising a furnace stack having a vertical peripheral wall defining a space therein which is open and communicating with the atmosphere at its lower end and sealed from the atmosphere at its upper end. An inlet is positioned at the lower end of the stack for introducing glass particles into the furnace stack, and burner means are centrally positioned at the lower end of the stack to provide an upwardly directed flame to produce an upward flow of hot combustion gases in the stack interior thereby propelling the molten glass upwardly through the central portion of the interior of the stack. A hopper for collecting the formed glass beads is positioned at the lower end of the stack interior and has one of its ends open and communicating with the atmosphere. The hopper further has a lower wall communicating with the lower end of the stack interior for collecting the formed glass beads which drop through the stack interior, and a vertical peripheral wall positioned outside of the stack wall, to define an opening thereinbetween for the exhaust of the gaseous flow from the furnace stack. The hopper bottom wall tapers outwardly and downwardly from the center of the stack interior towards the bottom of the hopper vertical peripheral wall, to form an outlet for the discharge of the formed glass beads from the hopper.

The features of the present invention which are believed to be novel are set forth with particularity in the appended claims. The invention, itself, however, both as to its organization and method of operation, together with further objects and features thereof may best be understood with reference to the following description taken in conjunction with the company and drawings wherein:

Figure 1:
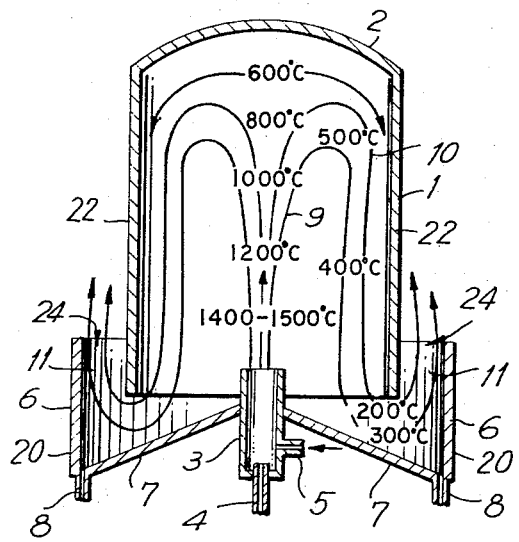
FIG. 1 is a vertical sectional view of a furnace constructed in accordance with the principles of the present invention.

Referring to FIG. 1, the furnace of the present invention is shown to comprise a vertical stack 1 whose upper end is sealed from the atmosphere by a hemispherical shaped cover plate 2, with the lower end of stack 1 being freely open. A burner 3, having an inlet 4 at the bottom end thereof for the supply of fuel thereto, is disposed at the lower free end of stack 1. An inlet 5 is located in one of the side walls of burner 3 to feed particles of glass to the flame produced by burner 3. Burner 3 may be selectively moved in a vertical direction, further into, or out of, the stack 1. A hopper 6, having a vertical peripheral wall 20 surrounding the lower portion of the side walls of stack 1, is disposed at the lower end of stack 1, and has its upper end open and communicating with the atmosphere. Hopper 6 has a lower wall communicating with the lower end of the interior of stack 1, and extends from the side walls of burner 3 outwardly and downwardly toward side wall 20 of hopper 6, to form an outlet 8 for the discharge of glass beads from hopper 6.

It is understood that the proper operation of the furnace of the present invention in accordance with the principles as hereinafter described, is not restricted to a furnace having a singular set of dimensions. However, in one operative embodiment, by way of example only, side walls 22 of stack 1 are from 2–3 meters in height, with stack 1 having an internal diameter of between 1.2 to 2 meters. The sidewalls 22 and cover portion 2 are not limited to particular materials, however, metallic materials are preferred, keeping in mind that any non-combustible material used for furnace construction may be used. Hopper 6 may suitably have an internal diameter ranging from 1.3 to 1.5 times the internal diameter of stack 1 as given above, and its vertical sidewalls 20, may suitably have a height of .5 to 1 meter, with hopper 6 being typically made of sheet metal. Burner 3 may typically have a diameter of about 15–25 cm.

The operation of the furnace of the present invention is as follows. Powdered glass particles are introduced at feeder inlet 5, where they are heated and carried upward by the flow of hot combustion gases provided by the flame of burner 3. The upward rate of flow of the hot combustion gases may be suitably regulated by varying the mixture of gas, fuel, oxygen and air, or adjusting the opening of the nozzle of the burner, with an upward gas flow of about 1 meter per second being suitable for powdered glass particles of approximately .1 millimeter in size. The temperature variation within the stack 1 along the travel path of the glass and combustion gases is shown in FIG. 1. The hottest temperature will be located approximately 1 to 1.3 meters above the nozzle of the burner, and will be between 1400–1500° centigrade, with the temperature decreasing as the gases rise towards the top of the stack where the gas temperature is about 600° centigrade.

The glass particles provided at feeder inlet 5 are carried upwardly with combustion gases in the direction shown by line 9, until they reach the upper portions of stack 1, where the flow of combustion gases and glass mushrooms out in all directions, in an "umbrella" effect, and then flows downwardly as shown by line 10 in a direction substantially parallel to the side walls 22 of stack 1, until the mixture of gases and glass beads reaches the bottom of stack 1. There the formed glass beads drop into hopper 6, and the gases are exhausted upwardly through opening 24, provided between the side walls 20 of hopper 6 and side walls 22 of stack 1. The formed glass beads which are collected in hopper 6 may be suitably discharged by the action of the force of gravity causing the beads to roll downwardly along the bottom wall 7 of hopper 6 and through discharge outlet 8 into a suitable receptacle (not shown).

Figure 3:
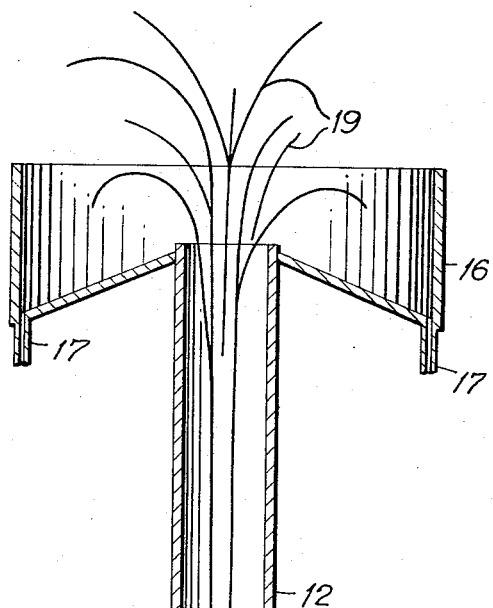
FIG. 3 depicts a furnace showing the prior art in the field of furnaces for the manufacture of glass beads.
Figure 2:
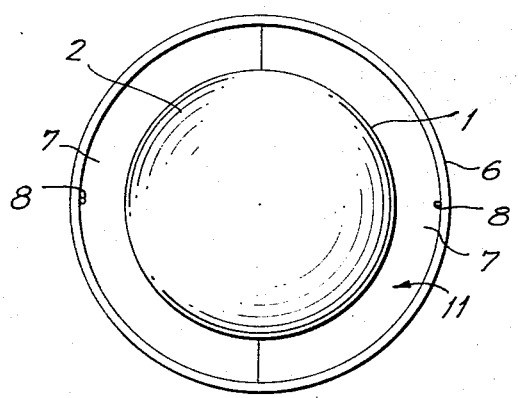
FIG. 2 is a top plan view of the apparatus shown in FIGURE 1.

Referring to FIG. 3, the presently used furnaces for manufacture of glass beads is shown to comprise an elongated stack 12 which is open to the atmosphere at its upper end. A hopper 16 for collecting the formed glass beads, having peripheral walls is positioned at the open upper end of stack 12, and includes a bead discharge outlet 17 at the junction of the hopper outer vertical peripheral walls and the inner wall sloping downwardly from the upper end of the stack 12 to the vertical peripheral wall of the hopper 16. A burner 13 is provided at the bottom end of stack 12, which is sealed from the atmosphere, including a feeder pipe 14 for the supply of fuel, and a feeder pipe 15 for the supply of ground glass particles to the flame of burner 13. It has been found that when the molten glass travels upward along the interior of stack 12 as shown by lines 18 and 19, some molten or partially molten glass will strike the interior of the sidewalls of stack 12, and stick thereto, causing a shutdown in operation of the furnace.

An important feature of the present invention, nowhere shown by the prior art configurations as illustrated by FIG. 3, resides in the elimination of the sticking of molten glass particles to the side walls of the stack. This is achieved by virtue of the sealing of the upper end of the stack 1 from the atmosphere, thereby preventing gas loss to the atmosphere, and the "umbrella" effect whereby the combustion gases containing the glass beads travel downwardly between the upward flow of hot gases and molten glass and the stack walls 22, thereby presenting a buffer between the upwardly flowing molten glass and the stack side walls 22, and consequently preventing the upwardly flowing molten glass from striking the side walls and sticking thereto. Thus, because the top of the stack 1 is sealed by means of cover plate 2, the upwardly flowing hot combustion gases do not dissipate directly into the atmosphere, as in presently used furnaces, but rather "mushroom" out in all directions at the top of the stack, to form an "umbrella" effect, causing the glass beads to flow with the gases around the stack walls as shown by lines 9 and 10 of FIG. 1, in the opposite direction to the molten glass which is moving upwardly through the furnace at the center section of the stack 1. In this way, the downward flow of gases and glass beads at line 10 acts as a "buffer" between the hot center section of the furnace and the relatively hot upward flow at line 9, and the relatively cool inner walls 22 of the stack 1, thereby preventing the upwardly flowing molten glass from reaching the side walls 22 of the furnace stack 1.

The following description of the correlation between the temperature of glass and its tendency to adhere, is shown in the following in Table I, which serves to further demonstrate the manner in which the apparatus of the present invention, is advantageous over presently used furnaces for the manufacture of glass beads, and should be considered in connection with the temperature distribution within stack 1, as shown in FIG. 1.

TABLE I

| Steps | Temp., ° C. | Forms | States | Remarks |
|---|---|---|---|---|
| 1 | (1) | Powdered glass | Solid | No adherence. |
| 2 | 600 | ----do---- | ----do---- | Do. |
| 3 | 800 | ----do---- | Almost hard | Slight adherence. |
| 4 | 1,000 | Begin to change | Partly soft | Great adherence. |
| 5 | 1,200 | Partly Spherical | Soft | Do. |
| 6 | 1,400 to 1,500 | Spherulized | Liquid | Very great adherence. |
| 7 | 1,200 | Glass beads | Soft | Great adherence. |
| 8 | 1,000 | ----do---- | Slightly soft | Considerable adherence. |
| 9 | 800 | ----do---- | Almost hard | Slight adherence. |
| 10 | 600 | ----do---- | Solid | No adherence. |
| 11 | (1) | ----do---- | ----do---- | Do. |

[1] Normal.

Referring to Table I above it is seemed that the risk of adherence of the molten glass to any surface that it might strike, is greatest at temperatures above 800° C. i.e. from steps 3–9. Referring to the temperature distribution inside the furnace stack 1 as shown in FIG. 1, it is seemed that in the apparatus of the present invention, steps 3–9 of Table I take place when the molten glass is separated from the side walls 22 by the downward flow at line 10 of cooler gas and solidified glass beads, which because of their solid condition have no tendency to stick to side walls 22 upon impingement thereon. By contrast, in the presently used furnaces as typified by FIG. 3, steps 3–9 of Table I take place without any buffer in close proximity to the stack walls 12, which presents a serious problem of glass sticking to the side walls, as pointed out above.

While there has been shown a particular embodiment of the present invention, it will be understood that it is not wished to be limited thereto since modifications can be made both in the structural arrangements of the hopper and the stack, as well as to the relative dimensions thereof, and it is contemplated in the appendant claims to cover any such modifications as fall within the true spirit and scope of this invention.

What is claimed is:

1. Apparatus for manufacturing glass beads comprising a furnace stack having a vertical peripheral wall defining a space therein, said space being open and communicating with the atmosphere at its lower end and sealed from the atmosphere at its upper end, and inlet positioned at the lower end of said space for introducing glass particles into said furnace stack, burner means positioned at said lower end of said space and operative to provide an upwardly directed flame thereby producing an upwardly directed flow of hot combustion gases in said space thereby propelling said glass particles upwardly through said space, a hopper positioned at the lower end of said space having one of its ends open and communicating with the atmosphere, said hopper having a lower wall communicating with the lower end of said space for collecting the formed glass beads which drop through said space, and a vertical peripheral wall positioned outside of said furnace peripheral wall thereby defining an opening therein between for the exhaust of said gaseous flow from said furnace, said hopper bottom wall tapering outwardly and downwardly from the interior of said space to the bottom of said hopper vertical peripheral wall to form an outlet for the discharge of glass beads from said hopper.

2. The apparatus of claim 1 wherein said outlet is positioned at the points of joinder of the bottom wall with the peripheral wall of said hopper.

3. The device of claim 2 wherein said bottom wall is formed from two walls joined at the central portion of said furnace tapering outwardly from their point of joinder to their points of joinder with the vertical peripheral wall of said hopper, said hopper being adapted to be moved in an upward and downward direction.

4. A method for forming glass beads in a vertical furnace which is sealed from the atmosphere at its upper end, comprising introducing at the lower end of said furnace glass particles and upwardly flowing hot combustion gasses for melting the glass particles and as a carrier therefore, said hot combustion gasses being projected at a velocity sufficient to carry the glass particles upwardly into a spherulizing zone below the upper end of the furnace to form glass beads, the gasses aforesaid carrying said formed glass beads substantially spreading and reversing direction as the said gasses approach the sealed upper end of the furnace, the aforesaid gasses and the formed glass beads carried thereby being thereafter propelled downwardly by convection and gravity along the side walls of the furnace for discharge, the so-downwardly propelled gasses carrying the glass beads aforesaid forming a barrier between the side walls of the furnace and the upwardly moving hot gasses carrying molten glass particles for spherulizing into glass beads, whereby to prevent contact of the molten glass particles aforesaid with the furnace upper end and side walls.

5. The method of claim 4 wherein the formed glass beads and the gasses carrying the same are discharged from the furnace by respectively causing the glass beads to drop by gravity through a downwardly extending discharge opening, and the gasses to flow upwardly through an upwardly extending discharge opening the respective discharge openings being located at the lower end of the furnace distant from the zone of entry of the hot gasses and the glass particles.

References Cited

UNITED STATES PATENTS

| | | | |
|---|---|---|---|
| 2,334,578 | 11/1943 | Potters | 65—142 |
| 2,600,963 | 6/1952 | Bland | 65—142 |
| 2,619,776 | 12/1952 | Potters | 65—142 |
| 2,794,301 | 6/1957 | Law et al. | 65—21 |

DONALL H. SYLVESTER, *Primary Examiner.*

G. R. MYERS, *Assistant Examiner.*